(12) United States Patent
Zhang et al.

(10) Patent No.: US 8,334,228 B2
(45) Date of Patent: Dec. 18, 2012

(54) FIBERGLASS COMPOSITIONS

(75) Inventors: Yuqiang Zhang, Tongxiang (CN); Guorong Cao, Tongxiang (CN); Bing Zhang, Tongxiang (CN); Lin Zhang, Tongxiang (CN); Wenzhong Xing, Tongxiang (CN); Guijiang Gu, Tongxiang (CN)

(73) Assignee: Jushi Group Co. Ltd., Zhejiang (CN)

( * ) Notice: Subject to any disclaimer, the term of this patent is extended or adjusted under 35 U.S.C. 154(b) by 378 days.

(21) Appl. No.: 12/637,737

(22) Filed: Dec. 14, 2009

(65) Prior Publication Data

US 2010/0222198 A1    Sep. 2, 2010

(30) Foreign Application Priority Data

Mar. 2, 2009  (CN) .......................... 2009 1 0096259

(51) Int. Cl.
*C03C 13/02* (2006.01)
*C03C 13/06* (2006.01)
(52) U.S. Cl. ................. 501/38; 501/35; 501/36; 501/70
(58) Field of Classification Search .................. 501/35, 501/36, 38, 70
See application file for complete search history.

(56) References Cited

U.S. PATENT DOCUMENTS

| | | | |
|---|---|---|---|
| 2,334,981 A | | 11/1943 | Ackley |
| 2,571,074 A | | 10/1951 | Tiede et al. |
| 5,576,252 A | * | 11/1996 | Rapp et al. ........................ 501/35 |
| 5,789,329 A | | 8/1998 | Easte et al. |
| 6,037,284 A | * | 3/2000 | Holstein et al. ................... 501/35 |
| 6,060,414 A | * | 5/2000 | Holstein et al. ................... 501/36 |
| 6,136,735 A | | 10/2000 | Gallo et al. |
| 6,686,304 B1 | | 2/2004 | Wallenberger |
| 6,818,575 B2 | | 11/2004 | Wallenberger |
| 6,933,045 B2 | * | 8/2005 | Tamura ........................... 428/364 |
| 6,962,886 B2 | | 11/2005 | Wallenberger |
| 7,153,799 B2 | | 12/2006 | Wallenberger |
| 7,427,576 B2 | * | 9/2008 | Kravchenko et al. ............ 501/38 |
| 7,449,243 B1 | | 11/2008 | Creux et al. |
| 7,449,419 B2 | * | 11/2008 | Li ..................................... 501/36 |
| 2007/0225145 A1 | * | 9/2007 | Bauer et al. ...................... 501/27 |
| 2008/0124559 A1 | * | 5/2008 | Fujiwara et al. ............... 428/432 |
| 2010/0184345 A1 | * | 7/2010 | Lalande et al. .................... 442/1 |

FOREIGN PATENT DOCUMENTS

| | | | |
|---|---|---|---|
| CN | 101575172 A | * | 11/2009 |
| FR | 2692248 A1 | * | 12/1993 |
| GB | 1391384 A | * | 11/1975 |
| GB | 1531287 A | * | 11/1978 |
| JP | 57077043 A | * | 5/1982 |
| WO | WO96/39362 | | 12/1996 |
| WO | WO00/73232 | | 12/2000 |
| WO | WO 0073232 A1 | * | 12/2000 |
| WO | WO01/32576 | | 5/2001 |
| WO | WO03/050049 | | 6/2003 |

* cited by examiner

*Primary Examiner* — Karl Group
*Assistant Examiner* — Elizabeth A Bolden
(74) *Attorney, Agent, or Firm* — Lewis Brisbois; Bisgaard & Smith LLP; Jon Hokanson

(57) ABSTRACT

This invention involves a fiberglass composition containing the following components: $SiO_2$, $Al_2O_3$, CaO, MgO, $B_2O_3$, $F_2$, $TiO_2$, $K_2O$, $Na_2O$, $Fe_2O_3$ and $SO_3$. The weight percentage of each of the components are as follows: $SiO_2$ 58~65%, CaO 20~26%, $Al_2O_3$ 9~17%, MgO 0.5~1%, $B_2O_3$ 0~5%, $F_2$ 0~1%, $TiO_2$ 0.1~1%, $K_2O+Na_2O$ 0~0.8%, $Fe_2O_3$ 0.1~0.5%, $SO_3$ 0~0.6%. The ternary system, $SiO_2$—$Al_2O_3$—CaO, is basis of the fiberglass composition in this invention, which also has low quantities of MgO and $B_2O_3$. In addition, the total amount of alkaline earth oxide and the proportional relationship between MgO and CaO are rationally designed, which helps to improve the mechanical strength, heat resistance, and chemical stability of the glass. It also has excellent manufacturing performance. Moreover, the raw materials of the fiberglass composition in this invention are low in cost, and the invention meets environmental protection requirements.

23 Claims, No Drawings

FIBERGLASS COMPOSITIONS

The present application claims priority from Chinese Patent Application No. 200910096259.X filed Mar. 2, 2009, the subject matter of which is incorporated herein by reference.

(1) TECHNICAL REALM

This invention involves a type of fiberglass composition, specifically a fiberglass composition that has low magnesium and low boron content.

(2) BACKGROUND TECHNOLOGY

E glass, or alkali-free glass, is used to manufacture the most commonly used glass components of continuous glass fiber. The ternary system $SiO_2$—$Al_2O_3$—$CaO$ is the basis of the components of alkali-free glass. In a ternary phase diagram, it is calcium feldspar, pseudo-wollastonite, and α-tridymite with a low eutectic point constituted by the liquid phase equilibrium. Its components and weight percentage contents are: $SiO_2$ 62%; $Al_2O_3$ 14.7%; $CaO$ 22.3%.

On this basis, $B_2O_3$ is added to the glass composition in place of some of the $SiO_2$, and MgO is added in place of some of the CaO to form the alkali-free glass component that is ordinarily used now. Its typical properties are described in U.S. Pat. No. 2,334,981 and U.S. Pat. No. 2,571,074, and the quaternary system $SiO_2$—$Al_2O_3$—$CaO$—$B_2O_3$ is generally its basis. In the glass composition in U.S. Pat. No. 2,571,074, $B_2O_3$ with a weight percentage content of 5~13% is added in place of a portion of the $SiO_2$ in order to decrease the glass molding and liquid line temperatures as well as to aid in the glass melting and the fiberglass drawing and molding. However, addition of a large amount of $B_2O_3$ results in high raw material costs for the traditional alkali-free glass and significant environmental pollution.

In the fiberglass industry, the molding temperature refers to the temperature at which the fused glass mass becomes easily drawn and molded. In reality, it is a realm in which the temperature range is equivalent to the temperature when the viscosity is $10^{2.5}$~$10^3$ cP. In this invention, the molding temperature is the temperature at which the viscosity is $10^3$ cP. The liquid line temperature refers to the temperature at which the crystal nucleus begins to form when the when the fused glass mass cools. In order to avoid any risk of devitrification during the fiberglass drawing process, ΔT value is used to indicate the difference between the molding temperature and the liquid line temperature. It should be accurate and, preferably, greater than 50° C. Greater ΔT values indicate that the fused glass mass has higher stability, which helps the glass fiber drawing and molding.

In addition, the content of all components mentioned in this invention are expressed as "%", which should be understood as "weight percentage" or "wt %".

The current mainstream low boron fiberglass composition is basically made up of the $SiO_2$—$Al_2O_3$—$CaO$—MgO quaternary system, of which the MgO content is usually greater than 1%. A boron-free fiberglass composition is described in patent WO96/39362, which is made up primarily of $SiO_2$, $Al_2O_3$, CaO, and MgO with little or no costly oxides added, such as $TiO_2$, SrO, MnO, and ZnO. In the preferred regimen, the quantity range of MgO is 2~3.5%, and this fiberglass composition has a higher ΔT value; however, its molding and liquid line temperatures are relatively high. Excessively high molding and liquid line temperatures will greatly increase energy consumption and accelerate high temperature aging of the kiln and platinum bushing, thereby increasing production costs. A low boron fiberglass composition is described in patent WO01/32576, which is made up primarily of $SiO_2$, $Al_2O_3$, CaO, and MgO. In the preferred regimen, the MgO quantity range is 1.5~4%. The ΔT value for this fiberglass composition is relatively high, and the molding and liquid line temperatures are not high. The $SiO_2$ content, however, is lower (less than 58%), which affects the mechanical strength of the glass to a certain extent.

Fiberglass compositions with MgO content less than 1% are very rare, and there are definite problems with the few patents that are known, specifically that they are unable to meet the requirements of industrialized production. For example, patent WO00/73232 uses a fiberglass composition with less than 1% MgO composition. It is made up primarily of the $SiO_2$—$Al_2O_3$—CaO ternary system with a certain amount of $B_2O_3$, $Li_2O$, ZnO, MnO, or $MnO_2$ also added in order to decrease the molding and liquid line temperatures. However, it can be seen in its embodiments that either the molding temperature remains somewhat high or the ΔT value is far less than 50° C. Moreover, the cost of the raw materials for this fiberglass composition is very high. Another example is the fiberglass composition described in patent WO03/050049 and used for automotive exhaust systems. By adding less than 1% MgO and more than 1.5% $TiO_2$, the objective of increasing acid resistance and heat resistance is achieved. However, because a large amount of $TiO_2$ is used, this fiberglass composition lacks cost advantage.

(3) DETAILED DESCRIPTION ON OF THE INVENTION

The technological issue that this invention seeks to resolve lies in providing a new type of low magnesium, low boron fiberglass composition that meets cost and environmental requirements and has excellent manufacturing and usage performance.

The technical plan used by this invention to resolve this technological issue is as follows:

A fiberglass composition containing the following components: $SiO_2$, $Al_2O_3$, CaO, MgO, $B_2O_3$, $F_2$, $TiO_2$, $K_2O$, $Na_2O$, $Fe_2O_3$ and $SO_3$ (with the total content of $SiO_2$, $Al_2O_3$, CaO, MgO, $B_2O_3$, $F_2$, $TiO_2$, $K_2O$, $Na_2O$, $Fe_2O_3$, and $SO_3$ equaling 100%). The weight percentages of each of the components are as follows:

| | |
|---|---|
| $SiO_2$ | 58~65% |
| CaO | 20~26% |
| $Al_2O_3$ | 9~17% |
| MgO | 0.5~1% |
| $B_2O_3$ | 0~5% |
| $F_2$ | 0~1% |
| $TiO_2$ | 0.1~1% |
| $R_2O = K_2O + Na_2O$ | 0~0.8% |
| $Fe_2O_3$ | 0.1~0.5% |
| $SO_3$ | 0~0.6% |

Wherein, the range of the sum of the weight percentages of CaO and MgO, RO=CaO+MgO, is between 21~27%.

In the fiberglass composition in this invention, the alkaline earth oxide components CaO and MgO follow the following formula: The defined specific value is Z1=RO/MgO, i.e., Z1=(CaO+MgO)/MgO, which represents the ratio of the sum of the weight percentage content of CaO and MgO and the weight percentage content of MgO. The range of the specific value Z1 is 21~43. This specific value can be expressed as the proportional relationship between MgO and CaO. It can, therefore, act as the parameter for controlling the glass devitrification and the liquid line temperature. The preferred Z1 range is 25~35.

The molding temperature for the fiberglass composition indicated in this invention is 1200~1300° C., and the liquid line temperature is generally more than 55° C. lower than the molding temperature.

What needs to be made clear is that, in addition to the components indicated above, some trace impurities from the raw materials may be unavoidable in the fiberglass composition in this invention. These trace impurities will not have a substantial effect on the fiberglass performance. Moreover, by not restricting the makeup of the fiberglass composition in this invention, SrO not greater than 1% can be added to the fiberglass composition to decrease the molding temperature and/or liquid line temperature. In addition, $CeO_2$ not greater than 1% can also be added to the fiberglass composition, which will result in an excellent clarification effect, oxidize a portion of the ferrous iron ions into ferric iron ions, and lighten the green color of the fiberglass. The weight percentage content of the aforementioned SrO and $CeO_2$ components also takes the total content of said $SiO_2$, $Al_2O_3$, CaO, MgO, $B_2O_3$, $F_2$, $TiO_2$, $K_2O$, $Na_2O$, $Fe_2O_3$, and $SO_3$ as 100%.

This invention specifically recommends a type of fiberglass composition that basically contains the following components, and the weight percentage of the content of each of said components $SiO_2$, $Al_2O_3$, CaO, MgO, $B_2O_3$, $F_2$, $TiO_2$, $K_2O$, $Na_2O$, $Fe_2O_3$, and $SO_3$ is indicated as follows:

| | |
|---|---|
| $SiO_2$ | 58~65% |
| CaO | 20~26% |
| $Al_2O_3$ | 9~17% |
| MgO | 0.5~1% |
| $B_2O_3$ | 0~5% |
| $F_2$ | 0~1% |
| $TiO_2$ | 0.1~1% |
| $R_2O = K_2O + Na_2O$ | 0~0.8% |
| $Fe_2O_3$ | 0.1~0.5% |
| $SO_3$ | 0~0.6% |
| RO = CaO + MgO | 21~27% |

In addition to the components listed above, the so-called "basic content" indicates components in the fiberglass composition that do not include other substantive effects; however, this invention does allow the unavoidable introduction of trace impurities in the production process.

The content of each of the components in the fiberglass composition of this invention also complies with the following formulation: The defined specific value $Z2=(SiO_2+Al_2O_3)/(RO+R_2O+B_2O_3+F_2)$, and the range of the specific value Z2 is 2.55~2.95. This specific value can be understood as the ratio between the total of the components that form the glass network and the total of the components that improve the glass network. Therefore, it can be treated as the parameter that adjusts the glass strength and viscosity.

In the fiberglass composition in this invention, $SiO_2$ is the main oxide forming the glass framework, and it also has a stabilizing effect on each of the components. The restricted $SiO_2$ content range in this invention is 58~65%. Too low of a content will affect the structural stability of the glass; too high of a content will cause an increase in the glass viscosity thereby resulting in clarity issues. The preferred $SiO_2$ content is 58~61%.

$Al_2O_3$ is another oxide in the fiberglass composition in this invention that forms the glass framework. When combined with $SiO_2$, it can have a substantive effect on the glass module and a significant effect on preventing glass phase splitting and on water resistance. The restricted quantity of $Al_2O_3$ in this invention is 9~17%. Too low of a quantity will cause the liquid line temperature to increase as well as cause the glass water resistance to vary. Too high a quantity will result in risk of loss of glass transparency as well as increased glass viscosity. The preferred $Al_2O_3$ quantity range is 12~15%.

CaO is the glass network external oxide in the fiberglass composition in this invention. An appropriate addition can increase the chemical stability and mechanical strength of the glass as well as shorten the glass frit and increase the molding rate. The restricted CaO quantity range in this invention is 20~26%. If the quantity is too low, the aforementioned effects will not be possible; if the quantity is too great, the tendency for the glass to crystallize will increase. The preferred CaO quantity range is 22~25%.

MgO has an effect similar to that of CaO in the fiberglass composition in this invention. It primarily regulates the glass viscosity and controls the glass devitrification. It also has a favorable effect on Young's modulus. The preferred restricted MgO quantity range is 0.5~1%. In this invention, a small amount of MgO and CaO are mixed, and the quantities of MgO and CaO are interrelated. The total amount of the two can yield low liquid line temperature glass within the specified range. Addition of a small amount of MgO can introduce competitive growth between $CaSiO_3$ and $CaMgSi_2O_6$ crystals, thereby retarding the growth of these types of crystals and achieving the objective of decreasing the risk of glass devitrification. If the MgO quantity is too high, especially if it is greater than or equal to 3.5%, the malacolite crystal growth rate will be particularly fast, thereby enabling the liquid line temperature to increase and deterring favorable glass drawing. Within the quantity ranges of this invention, when the CaO and MgO quantities are greater than 22% and 0.5%, respectively, and the total quantity of alkaline earth oxides is greater than 23%, favorable drawing performance can be obtained. However, their total quantity should not exceed 26% because, in this case, the CaO quantity is too high and can lead to an increase in the rate of glass devitrification generating wollastonite, thereby bawling favorable glass drawing. At the same time, because the $Mg^{2+}$ ion field strength is greater than that of $Ca^{2+}$, the addition of an appropriate amount of MgO can increase the mechanical strength and chemical stability of the glass. The preferred MgO quantity range is 0.7~1%.

The preferred CaO and MgO total quantity is 23~26%.

$B_2O_3$ is the glass network organizer in the fiberglass composition in this invention. It has a good fluxing effect and is also a component that can decrease the glass molding temperature and the liquid line temperature. The restricted $B_2O_3$ quantity range in this invention is 0~5%, and the desired quantity restriction is actually a very small value because the cost of the raw materials that contain boron is very high. In addition, boron is a volatile pollutant substance which needs to be eliminated in the exhaust gas. If the $B_2O_3$ quantity is too high, production costs will increase and waste material secondary pollution will easily result. Therefore, it is advantageous to decrease the quantity of $B_2O_3$. The preferred $B_2O_3$ quantity range is 0~2%, and 0~1% is even more preferable.

There is also a small amount of $TiO_2$ in the fiberglass composition in this invention which is basically introduced by mineral raw materials in the form of impurities. It not only can decrease glass viscosity at high temperatures, it also has a certain fluxing effect. A small amount of fluorine is also added to the fiberglass composition in this invention to improve the ability of the glass to melt.

The E glass alkali metal content stipulated by China must be less than 0.8%, so the total alkali metal content in the fiberglass composition in this invention is kept within 0.8%.

The preferred plan: Said fiberglass composition basically contains the following components: $SiO_2$, $Al_2O_3$, CaO, MgO, $B_2O_3$, $F_2$, $TiO_2$, $K_2O$, $Na_2O$, $Fe_2O_3$, and $SO_3$; based on the quantities of each of said components, the weight percentages of each are as follows:

| | |
|---|---|
| $SiO_2$ | 58~61% |
| CaO | 22~25% |
| $Al_2O_3$ | 12~15% |
| MgO | 0.7~1% |
| $B_2O_3$ | 0~2% |
| $F_2$ | 0~1% |
| $TiO_2$ | 0.1~1% |
| $R_2O = K_2O + Na_2O$ | 0~0.8% |
| $Fe_2O_3$ | 0.1~0.5% |
| $SO_3$ | 0~0.6% |
| RO = CaO + MgO | 23~26% |

Wherein, the component content follows the following proportional relationship: 25<Z1<35.

A more preferred plan: Said fiberglass composition basically contains the following components: $SiO_2$, $Al_2O_3$, CaO, MgO, $B_2O_3$, $F_2$, $TiO_2$, $K_2O$, $Na_2O$, $Fe_2O_3$, and $SO_3$; based on the quantities of each of said components, the weight percentages of each are as follows: $SiO_2$ 58~61%

| | |
|---|---|
| CaO | 22~25% |
| $Al_2O_3$ | 12~15% |
| MgO | 0.7~1% |
| $B_2O_3$ | 0~1% |
| $F_2$ | 0~1% |
| $TiO_2$ | 0.1~1% |
| $R_2O = K_2O + Na_2O$ | 0~0.8% |
| $Fe_2O_3$ | 0.1~0.5% |
| $SO_3$ | 0~0.6% |
| RO = CaO + MgO | 23~26% |

Specifically, said fiberglass composition can be constituted of the following components: $SiO_2$, $Al_2O_3$, CaO, MgO, $B_2O_3$, $F_2$, $TiO_2$, $K_2O$, $Na_2O$, $Fe_2O_3$, and $SO_3$; based on the quantities of each of said components, the weight percentage quantities of each are as follows:

| | |
|---|---|
| $SiO_2$ | 58~65% |
| CaO | 20~26% |
| $Al_2O_3$ | 9~17% |
| MgO | 0.5~1% |
| $B_2O_3$ | 0~5% |
| $F_2$ | 0~1% |
| $TiO_2$ | 0.1~1% |
| $R_2O = K_2O + Na_2O$ | 0~0.8% |
| $Fe_2O_3$ | 0.1~0.5% |
| $SO_3$ | 0~0.6% |
| SrO | 0~1% |
| $CeO_2$ | 0~1% |
| RO = CaO + MgO | 21~27% |

What needs to be pointed out is that the quantities of the components of said fiberglass composition —$SiO_2$, $Al_2O_3$, CaO, MgO, $B_2O_3$, $F_2$, $TiO_2$, $K_2O$, $Na_2O$, $Fe_2O_3$, and $SO_3$— total 100%, and the total amount of the fiberglass composition yielded may be greater than 100%.

The ternary system $SiO_2$—$Al_2O_3$—CaO is the basis for the fiberglass composition in this invention. A small amount of MgO and $B_2O_3$ are introduced, and a proportional relationship is rationally designed between the total amount of alkaline earth oxides and MgO and CaO. It has the following advantages:

a) Because the $Mg^{2+}$ ion field strength is greater than that of $Ca^{2+}$, addition of an appropriate amount of MgO to the fiberglass can increase the mechanical strength and chemical stability of the glass. At the same time, by way of a rationally designed proportional relationship between the total amount of alkaline earth oxides and MgO and CaO, the glass devtirification and liquid line temperature are effectively controlled. When Z1 is between 21~43 in this invention, the fiberglass composition has relatively low molding temperature and liquid line temperature, thereby decreasing the risk of glass devitrification and benefiting favorable drawing of the fiberglass. Therefore, the fiberglass composition in this invention not only helps to improve the mechanical strength, heat resistance, and chemical stability of the glass, it also has favorable drawing performance.

b) Using a low boron formulation, the amount that will decrease $B_2O_3$ will decrease costs as well as meet environmental protection requirements.

(4) EXAMPLES

Specific explanation of the technical plan for this invention is provided below through working examples.

For convenience of operations in the working examples of this invention, the total content of the fiberglass composition is 100%, wherein the total content of the working example components is slightly less than 100%, and the remaining amount can be understood to be trace impurities or a small amount of components that cannot be analyzed out.

The primary raw materials for production of the fiberglass in this invention are pyrophillite, quartz powder, magnesium limestone, dolomite, and borocaleite. The specific procedures for the working examples in this invention are as follows: Each composition can be acquired from the appropriate raw materials (e.g., $SiO_2$ in quartz powder and CaO in magnesium limestone). Mix the raw materials in the appropriate proportions so that each component reaches the final expected weight proportion. Then, melt and clarify the mixed batch in a tank furnace. The glass liquid that has been formed flows through the access to the fiber molding bushing well, which is situated at the bottom of the access. The glass liquid is drawn out through the discharge spout on the bushing well, thereby forming the fiberglass. The fiberglass is drawn around to the top of the rotary fiber drawing machine to form a protofilament cake or fiberglass yarn ball, and conventional methods can be used to deep process these fiberglasses to meet the expected requirements.

The six working examples for this invention are listed in Tables 1 and 2. They are numbered C1-C6, and in addition, there are two comparative working examples numbered E1-E2. E1 is a traditional E fiberglass composition, and E2 is the fiberglass composition in patent WO96/39362. The content of each of the components of the fiberglass compositions are indicated using weight percentage.

Four basic parameters are given in the tables to explain the merits of the fiberglass composition in this invention:

1—Molding temperature, the temperature at which the glass fused mass has a viscosity of $10^3$ cP.

2—Liquid line temperature, the temperature at which the crystal nucleus begins to form when the glass fused mass cools off—i.e., the upper limit temperature for glass devitrification.

3—ΔT value, which is the difference between the molding temperature and the liquid line temperature and indicates the temperature range at which fiber drawing molding can be performed. Technical personnel in this field of technology are well acquainted with the aforementioned three temperature values and the methods for measuring them.

4—ASTM D2343 is the standard for measuring the tensile strength of fiberglass that uses epoxy resin as the basic composite material for strengthening.

TABLE 1

|  |  | C1 | C2 | C3 | C4 |
|---|---|---|---|---|---|
| Component | $SiO_2$ | 59.31 | 58.62 | 59.03 | 58.43 |
|  | $Al_2O_3$ | 14.06 | 13.81 | 13.52 | 13.82 |
|  | CaO | 23.01 | 23.59 | 23.02 | 23.11 |
|  | MgO | 0.82 | 0.81 | 0.83 | 0.81 |
|  | $B_2O_3$ | 0.63 | 1.02 | 1.53 | 2.02 |
|  | $Na_2O$ | 0.46 | 0.46 | 0.46 | 0.45 |
|  | $K_2O$ | 0.23 | 0.23 | 0.25 | 0.23 |
|  | $Fe_2O_3$ | 0.41 | 0.41 | 0.39 | 0.41 |
|  | $TiO_2$ | 0.35 | 0.35 | 0.34 | 0.35 |
|  | $F_2$ | 0.39 | 0.41 | 0.42 | 0.19 |
| Parameter | Z1 | 29.06 | 29.88 | 28.73 | 29.53 |
|  | Z2 | 2.83 | 2.73 | 2.74 | 2.69 |
|  | Molding temperature/° C. | 1255 | 1243 | 1242 | 1239 |
|  | Liquid line temperature/° C. | 1175 | 1169 | 1171 | 1163 |
|  | ΔT value/° C. | 80 | 74 | 71 | 76 |
|  | Tensile strength/Mpa | 2203.6 | 2165.2 | 2156.5 | 2133.8 |

TABLE 2

|  |  | C5 | C6 | E1 | E2 |
|---|---|---|---|---|---|
| Component | $SiO_2$ | 59.65 | 59.31 | 54.16 | 59.45 |
|  | $Al_2O_3$ | 13.65 | 13.75 | 14.32 | 13.48 |
|  | CaO | 22.95 | 22.66 | 22.12 | 22.69 |
|  | MgO | 0.92 | 0.88 | 0.41 | 3.23 |
|  | $B_2O_3$ | 0.61 | 0.62 | 7.26 | 0 |
|  | $Na_2O$ | 0.45 | 0.46 | 0.45 | 0.03 |
|  | $K_2O$ | 0.24 | 0.25 | 0.25 | 0.63 |
|  | $Fe_2O_3$ | 0.41 | 0.41 | 0.39 | 0.36 |
|  | $TiO_2$ | 0.36 | 0.35 | 0.34 | 0.04 |
|  | SrO | — | 0.65 | — | — |
|  | $CeO_2$ | — | 0.25 | — | — |
|  | $F_2$ | 0.41 | 0.36 | 0.29 | 0.04 |
| Parameter | Z1 | 25.95 | 26.75 | 54.95 | 8.03 |
|  | Z2 | 2.87 | 2.89 | 2.22 | 2.74 |
|  | Molding temperature/° C. | 1256 | 1251 | 1175 | 1264 |
|  | Liquid line temperature/° C. | 1180 | 1173 | 1075 | 1193 |
|  | ΔT value/° C. | 76 | 78 | 100 | 71 |
|  | Tensile strength/Mpa | 2192.5 | 2190.3 | 1981.6 | 2191.2 |

It can be seen from Tables 1 and 2 that, with regard to the composite material tensile strength, the fiberglass in this invention is superior to traditional E fiberglass (comparative working example E1), When compared with comparative working example E2, the fiberglass in this invention has relatively low molding and liquid line temperatures. This helps to decrease energy consumption and slows the high temperature aging of the furnace and bushing well. At the same time, the fiberglass in this invention also has tensile strength that is sufficiently comparable with that in comparative working example E2, and the manufacturing molding conditions are somewhat improved.

The invention claimed is:

1. A fiberglass composition comprising:

| $SiO_2$ | 58~65% by weight, |
|---|---|
| CaO | 20~26% by weight, |
| $Al_2O_3$ | 9~17% by weight, |
| MgO | 0.5~1% by weight, |
| $B_2O_3$ | 0~5% by weight, |
| $F_2$: | >0~1% by weight, |
| $TiO_2$ | 0.1~1% by weight, |
| $R_2O = K_2O + Na_2O$ | 0~0.8% by weight, |
| $Fe_2O_3$ | 0.1~0.5% by weight, |
| $SO_3$: | >0~0.6% by weight, |
| RO = CaO + MgO | 21~27% by weight, | and wherein the component content follows the following proportional relationship:

$$21 < Z1 = RO/MgO < 43.$$

2. The fiberglass composition of claim 1, wherein the content of the components indicated follows the following proportional relationship:

$$2.55 < Z2 = (SiO_2 + Al_2O_3)/(RO + R_2O + B_2O_3 + F_2) < 2.95.$$

3. The fiberglass composition of claim 1, wherein the $SiO_2$ content is 58~61% by weight.

4. The fiberglass composition of claim 1, wherein the $Al_2O_3$ content is 12~15% by weight.

5. The fiberglass composition of claim 1, wherein the CaO content is 22~25% by weight.

6. The fiberglass composition of claim 1, wherein the $B_2O_3$ content is 0~2% by weight.

7. The fiberglass composition of claim 1, wherein the MgO content is 0.7~1% by weight.

8. The fiberglass composition of claim 1 further comprising:

| SrO | 0~1% by weight and |
|---|---|
| $CeO_2$ | 0~1% by weight. |

9. The fiberglass composition of claim 1 wherein the $B_2O_3$ is 0~1.9% by weight.

10. The fiberglass composition of claim 1 wherein the $B_2O_3$ is 0~1% by weight.

11. A fiberglass composition consisting essentially of:

| $SiO_2$ | 58~65% by weight, |
|---|---|
| CaO | 20~26% by weight, |
| $Al_2O_3$ | 9~17% by weight, |
| MgO | 0.5~1% by weight, |
| $B_2O_3$ | 0~5% by weight, |
| $F_2$: | >0~1% by weight, |
| $TiO_2$ | 0.1~1% by weight, |
| $R_2O = K_2O + Na_2O$ | 0~0.8% by weight, |
| $Fe_2O_3$ | 0.1~0.5% by weight, |
| $SO_3$: | >0~0.6% by weight, |
| RO = CaO + MgO | 21~27% by weight, | and wherein the component content follows the following proportional relationship:

$$21 < Z1 = RO/MgO < 43.$$

12. The fiberglass composition of claim 11, wherein the content of the components indicated follows the following proportional relationship:

$$2.55 < Z2 = (SiO_2 + Al_2O_3)/(RO + R_2O + B_2O_3 + F_2) < 2.95.$$

13. The fiberglass composition of claim 11, wherein the $SiO_2$ content is 58~61% by weight.

14. The fiberglass composition of claim 11, wherein the $Al_2O_3$ content is 12~15% by weight.

15. The fiberglass composition of claim 11, wherein the CaO content is 22~25% by weight.

16. The fiberglass composition of claim 11, wherein the $B_2O_3$ content is 0~2% by weight.

17. The fiberglass composition of claim 11, wherein the MgO content is 0.7~1% by weight.

18. The fiberglass composition of claim 11 further wherein:

| | |
|---|---|
| $SiO_2$ | 58~61%, by weight |
| CaO | 22~25% by weight, |
| $Al_2O_3$ | 12~15% by weight, |
| MgO | 0.7~1% by weight, |
| $B_2O_3$ | 0~2% by weight, |
| $F_2$: | >0~1% by weight, |
| $TiO_2$ | 0.1~1% by weight, |
| $R_2O = K_2O + Na_2O$ | 0~0.8% by weight, |
| $Fe_2O_3$ | 0.1~0.5% by weight, |
| $SO_3$: | >0~0.6% by weight, |
| RO = CaO + MgO | 23~26% by weight, | and wherein the component content follows the following proportional relationship:

$$25<Z1=RO/MgO<35.$$

19. The fiberglass composition of claim 11 wherein the $B_2O_3$ is 0~1.9% by weight.

20. The fiberglass composition of claim 11 wherein the $B_2O_3$ is 0~1% by weight.

21. A fiberglass composition comprising:

| | |
|---|---|
| $SiO_2$ | 58~65% by weight, |
| CaO | 20~26% by weight, |
| $Al_2O_3$ | 9~17% by weight, |
| MgO | 0.5~1% by weight, |
| $B_2O_3$ | 0~5% by weight, |
| $F_2$: | >0~1% by weight, |
| $TiO_2$ | 0.1~1% by weight, |
| $R_2O = K_2O + Na_2O$ | 0~0.8% by weight, |
| $Fe_2O_3$ | 0.1~0.5% by weight, |
| $SO_3$: | >0~0.6% by weight, |
| SrO | 0~1% by weight, |
| $CeO_2$ | 0~1% by weight, and |
| RO = CaO + MgO | 21~27% by weight. |

22. A fiberglass composition comprising:

| | |
|---|---|
| $SiO_2$ | 58~65% by weight, |
| CaO | 20~26% by weight, |
| $Al_2O_3$ | 9~17% by weight, |
| MgO | 0.5~1% by weight, |
| $B_2O_3$ | 0~1% by weight, |
| $F_2$: | >0~1% by weight, |
| $TiO_2$ | 0.1~1% by weight, |
| $R_2O = K_2O + Na_2O$ | 0~0.8% by weight, |
| $Fe_2O_3$ | 0.1~0.5% by weight, |
| $SO_3$: | >0~0.6% by weight, and |
| RO = CaO + MgO | 21~27% by weight. |

23. A fiberglass composition consisting essentially of:

| | |
|---|---|
| $SiO_2$ | 58~65% by weight, |
| CaO | 20~26% by weight, |
| $Al_2O_3$ | 9~17% by weight, |
| MgO | 0.5~1% by weight, |
| $B_2O_3$ | 0~1% by weight, |
| $F_2$: | >0~1% by weight, |
| $TiO_2$ | 0.1~1% by weight, |
| $R_2O = K_2O + Na_2O$ | 0~0.8% by weight, |
| $Fe_2O_3$ | 0.1~0.5% by weight, |
| $SO_3$: | >0~0.6% by weight, and |
| RO = CaO + MgO | 21~27% by weight. |

* * * * *

UNITED STATES PATENT AND TRADEMARK OFFICE
CERTIFICATE OF CORRECTION

| | | |
|---|---|---|
| PATENT NO. | : 8,334,228 B2 | |
| APPLICATION NO. | : 12/637737 | |
| DATED | : December 18, 2012 | |
| INVENTOR(S) | : Yuqiang Zhang et al. | |

It is certified that error appears in the above-identified patent and that said Letters Patent is hereby corrected as shown below:

In the Specifications

Column 2, line 31, delete "ON";

In the Claims

Column 9, line 16 of the table, replace "weight" with --weight,--;

Column 9, line 37 of the table, replace "58-65%" with --58-61%--.

Signed and Sealed this
Twenty-eighth Day of January, 2014

Michelle K. Lee
*Deputy Director of the United States Patent and Trademark Office*